United States Patent
Wang

(10) Patent No.: US 10,207,430 B2
(45) Date of Patent: Feb. 19, 2019

(54) ULTRAVIOLET CURING DEVICE

(71) Applicant: Wuhan China Star Optoelectronics Technology Co., Ltd., Wuhan (CN)

(72) Inventor: Mingliang Wang, Wuhan (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 0 days.

(21) Appl. No.: 15/571,046

(22) PCT Filed: May 18, 2017

(86) PCT No.: PCT/CN2017/084854
§ 371 (c)(1),
(2) Date: Nov. 1, 2017

(87) PCT Pub. No.: WO2018/188156
PCT Pub. Date: Oct. 18, 2018

(65) Prior Publication Data
US 2018/0297244 A1    Oct. 18, 2018

(30) Foreign Application Priority Data
Apr. 14, 2017 (CN) .......................... 2017 1 0245725

(51) Int. Cl.
| G02F 1/01 | (2006.01) |
| G02F 1/29 | (2006.01) |
| B29C 35/08 | (2006.01) |
| G02F 1/13 | (2006.01) |
| G02F 1/1339 | (2006.01) |
| B29L 31/34 | (2006.01) |

(52) U.S. Cl.
CPC ........ B29C 35/0805 (2013.01); G02F 1/1303 (2013.01); B29C 2035/0827 (2013.01); B29L 2031/3475 (2013.01); G02F 1/1339 (2013.01)

(58) Field of Classification Search
CPC ......... B29C 35/0805; B29C 2035/0827; G02F 1/1303; G02F 1/1339; B29L 2031/3475
USPC ................................ 250/492.1, 493.1, 504 R
See application file for complete search history.

(56) References Cited

U.S. PATENT DOCUMENTS

| 6,973,874 | B2* | 12/2005 | DeMoore | B41F 23/0409 |
| | | | | 101/424.1 |
| 2008/0094460 | A1* | 4/2008 | Nakata | B41J 11/002 |
| | | | | 347/102 |
| 2010/0242299 | A1* | 9/2010 | Siegel | B41F 23/0409 |
| | | | | 34/275 |
| 2014/0037288 | A1* | 2/2014 | Matsumoto | G02B 6/3504 |
| | | | | 398/48 |

* cited by examiner

Primary Examiner — Nicole Ippolito

(57) ABSTRACT

An ultraviolet curing device is proposed, which includes a light source assembly, and a first reflection plate and a second reflection plate connected to the light source assembly and disposed at two sides of the light source assembly, respectively. Both of the first reflection plate and the second reflection plate are scalable along lengthwise directions to make the distance between the light source assembly and the to-be-cured display panel adjustable and make all the ultraviolet rays from the light source assembly be able to be used to cure the to-be-cured display panel.

18 Claims, 2 Drawing Sheets

ULTRAVIOLET CURING DEVICE

RELATED APPLICATIONS

This application is a National Phase of PCT Patent Application No. PCT/CN2017/084854 having International filing date of May 18, 2017, which claims the benefit of priority of Chinese Patent Application No. 201710245725.0 filed on Apr. 14, 2017. The contents of the above applications are all incorporated by reference as if fully set forth herein in their entirety.

FIELD AND BACKGROUND OF THE INVENTION

The present disclosure relates to a technology of curing a frame sealing glue, and more particularly, to an ultraviolet curing device.

In the existing skills, a liquid crystal infusion technique is usually adopted in pouring liquid crystal molecules into cells for large-scale display panels. Such a technique is first to drop a liquid crystal material onto the surface of a lower glass substrate. A glue dispenser machine is then utilized to apply a frame sealing glue with ultraviolet irradiation. Next, the lower glass substrate is placed in a vacuum environment, and then is aligned with and attached to an upper glass substrate, and a curing operation is performed therebetween. In this way, packaging the cells of the display panels is accomplished.

Currently, curing the frame sealing glue is usually carried out using an ultraviolet curing device. In order to prevent the heat emanated from a light source from affecting the display panel, the existing ultraviolet curing device deploys the light source as away from the display panel as possible in curing operations. However, this causes ultraviolet rays to scatter. A part of the ultraviolet rays emitted from the light source will scatter toward two sides of the display panel, thereby causing an energy loss of the ultraviolet rays and affecting the efficiency.

Therefore, there is a need to provide an ultraviolet curing device in order to solve the problems in the existing skills.

SUMMARY OF THE INVENTION

The objective of the present disclosure is to provide an ultraviolet curing device, which can prevent the heat emanated from a light source assembly from affecting a to-be-cured display panel as well as reflect the ultraviolet rays scattered toward two sides of the light source assembly, thereby improving efficiency.

The present disclosure provides an ultraviolet curing device, comprising a light source assembly, and a first reflection plate and a second reflection plate connected to the light source assembly and disposed at two sides of the light source assembly, respectively; the light source assembly configured to emit ultraviolet rays, the first reflection plate and the second reflection plate configured to reflect the ultraviolet rays emitted from the light source assembly toward the two sides of the light source assembly, to a to-be-cured display panel; both of the first reflection plate and the second reflection plate being scalable along lengthwise directions to make a distance between the light source assembly and the to-be-cured display panel adjustable and make all the ultraviolet rays from the light source assembly be able to be used to cure the to-be-cured display panel; both of the first reflection plate and the second reflection plate configured to be a barrel with an adjustable length; both of the first reflection plate and the second reflection plate made of a heat-resistant material.

In the ultraviolet curing device of the present disclosure, the first reflection plate is connected to the light source assembly via a first angle adjusting member, and the second reflection plate is connected to the light source assembly via a second angle adjusting member; the first angle adjusting member and the second angle adjusting member makes an angle between the first reflection plate and the light source assembly and an angle between the second reflection plate and the light source assembly adjustable.

In the ultraviolet curing device of the present disclosure, the first reflection plate is connected to the light source assembly via a first position adjusting member, and the second reflection plate is connected to the light source assembly via a second position adjusting member; the first position adjusting member and the second position adjusting member makes a distance between the first reflection plate and the second reflection plate adjustable.

In the ultraviolet curing device of the present disclosure, the heat-resistant material is metal.

In the ultraviolet curing device of the present disclosure, the ultraviolet curing device further comprises a sample stage disposed beneath the light source assembly and configured to support the to-be-cured display panel.

In the ultraviolet curing device of the present disclosure, the sample stage is a conveyor belt for transmitting the to-be-cured display panel along a horizontal direction.

In the ultraviolet curing device of the present disclosure, the light source assembly comprises a light box, and a light source and a third reflection plate disposed inside the light box; the third reflection plate configured to reflect the ultraviolet rays emitted from the light source toward an inner side of the light box, to the to-be-cured display panel.

In the ultraviolet curing device of the present disclosure, the first reflection plate and the second reflection plate are deployed with scales.

The present disclosure further provides an ultraviolet curing device, comprising a light source assembly, and a first reflection plate and a second reflection plate connected to the light source assembly and disposed at two sides of the light source assembly, respectively; the light source assembly configured to emit ultraviolet rays, the first reflection plate and the second reflection plate configured to reflect the ultraviolet rays emitted from the light source assembly toward the two sides of the light source assembly, to a to-be-cured display panel; both of the first reflection plate and the second reflection plate being scalable along lengthwise directions to make a distance between the light source assembly and the to-be-cured display panel adjustable and make all the ultraviolet rays from the light source assembly be able to be used to cure the to-be-cured display panel.

In the ultraviolet curing device of the present disclosure, both of the first reflection plate and the second reflection plate are configured to be a barrel with an adjustable length.

In the ultraviolet curing device of the present disclosure, the first reflection plate is connected to the light source assembly via a first angle adjusting member, and the second reflection plate is connected to the light source assembly via a second angle adjusting member; the first angle adjusting member and the second angle adjusting member makes an angle between the first reflection plate and the light source assembly and an angle between the second reflection plate and the light source assembly adjustable.

In the ultraviolet curing device of the present disclosure, the first reflection plate is connected to the light source assembly via a first position adjusting member, and the second reflection plate is connected to the light source assembly via a second position adjusting member; the first position adjusting member and the second position adjusting member makes a distance between the first reflection plate and the second reflection plate adjustable.

In the ultraviolet curing device of the present disclosure, both of the first reflection plate and the second reflection plate are made of a heat-resistant material.

In the ultraviolet curing device of the present disclosure, the heat-resistant material is metal.

In the ultraviolet curing device of the present disclosure, the ultraviolet curing device further comprises a sample stage disposed beneath the light source assembly and configured to support the to-be-cured display panel.

In the ultraviolet curing device of the present disclosure, the sample stage is a conveyor belt for transmitting the to-be-cured display panel along a horizontal direction.

In the ultraviolet curing device of the present disclosure, the light source assembly comprises a light box, and a light source and a third reflection plate disposed inside the light box; the third reflection plate configured to reflect the ultraviolet rays emitted from the light source toward an inner side of the light box, to the to-be-cured display panel.

In the ultraviolet curing device of the present disclosure, the first reflection plate and the second reflection plate are deployed with scales.

In the ultraviolet curing device of the present disclosure, the first reflection plate and the second reflection plate are disposed at the two sides of the light source assembly. The first reflection plate and the second reflection plate are configured to reflect the ultraviolet rays emitted from the light source assembly toward the two sides of the light source assembly, to the to-be-cured display panel. Also, the first reflection plate and the second reflection plate can be extended along their lengthwise directions. In such a way, the present disclosure can prevent the heat emanated from the light source assembly from affecting the to-be-cured display panel. Also, the ultraviolet rays scattered toward the two sides of the light source assembly can be reflected to the to-be-cured display panel. The efficiency is improved.

To make above content of the present invention more easily understood, it will be described in details by using preferred embodiments in conjunction with the appending drawings.

BRIEF DESCRIPTION OF THE SEVERAL VIEWS OF THE DRAWINGS

The technical schemes and other beneficial effects will be more apparent with reference to the detailed descriptions of the embodiments of the present invention below in accompanying with the drawings.

DESCRIPTION OF SPECIFIC EMBODIMENTS OF THE INVENTION

To further illustrate the technical schemes adopted in the present disclosure and their corresponding effects, preferred embodiments of the present disclosure will be described in detail with reference to the appending drawings. Obviously, the embodiments described herein are a part rather than all of the embodiments of the present disclosure. All other embodiments obtained by a person of ordinary skill in the art based on the embodiments of the present disclosure without creative efforts shall fall within the scope of the present disclosure.

Figure 1:
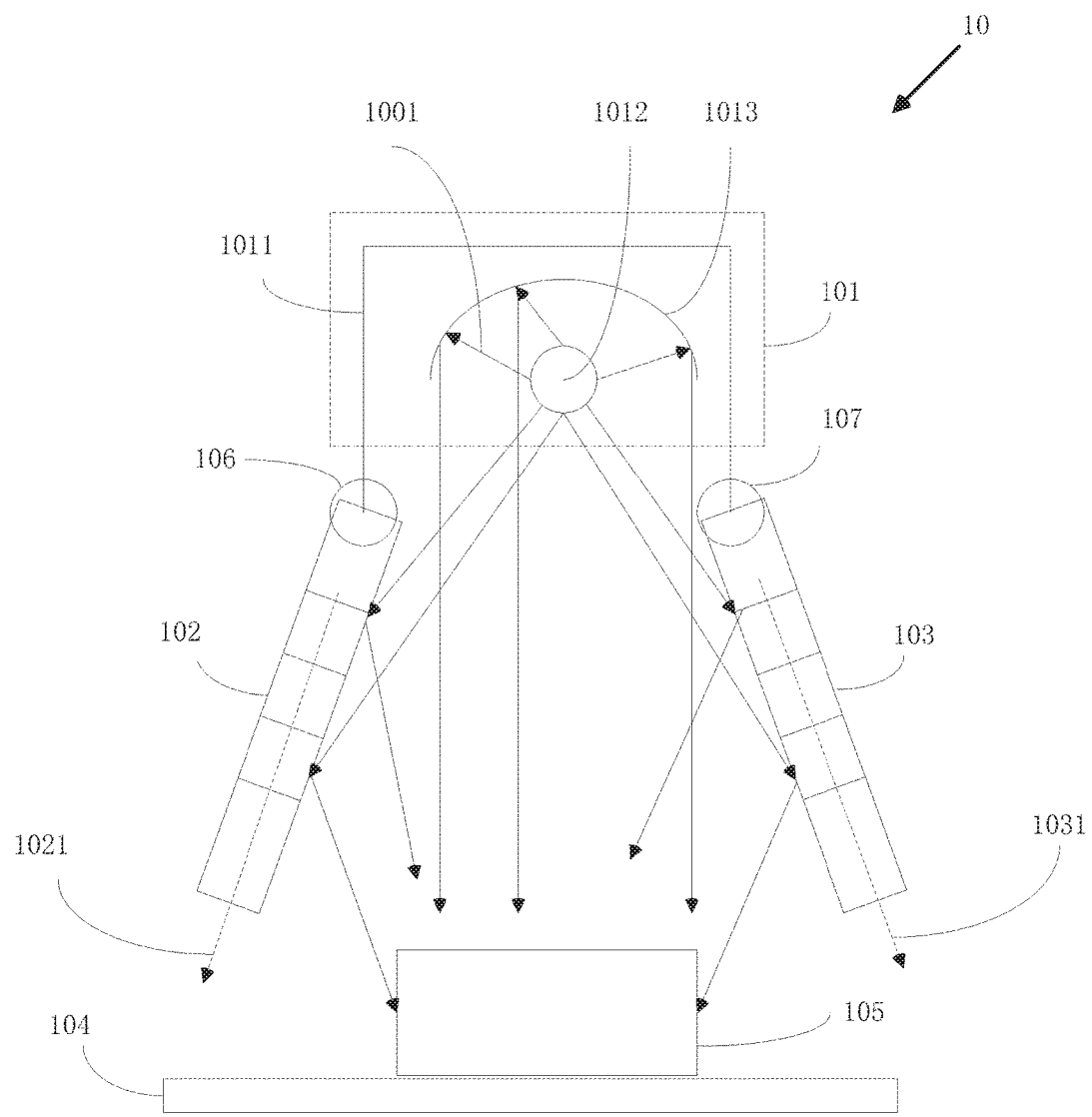
FIG. 1 is a schematic structural diagram illustrating an ultraviolet curing device provided in accordance with a first preferred embodiment of the present disclosure.

FIG. 1 is a schematic structural diagram illustrating an ultraviolet curing device provided in accordance with a first preferred embodiment of the present disclosure. As shown in FIG. 1, the ultraviolet curing device 10 provided in the present preferred embodiment includes a light source assembly 101, a first reflection plate 102, a second reflection plate 103, and a sample stage 104. The light source assembly 101 is configured to emit ultraviolet rays 1001. Both of the first reflection plate 102 and the second reflection plate 103 are connected to the light source assembly 101 and are disposed at two sides of the light source assembly 101, respectively. The first reflection plate 102 and the second reflection plate 103 are configured to reflect the ultraviolet rays emitted from the light source assembly 101 toward the two sides of the light source assembly 101, to a to-be-cured display panel 105. The sample stage 104 is disposed beneath the light source assembly 101 and is configured to support the to-be-cured display panel 105.

Further, the light source assembly 101 includes a light box 1011, and a light source 1012 and a third reflection plate 1013 disposed inside the light box 1011. The light box 1011 is configured to support the light source 1012 and the third reflection plate 1013. The light source 1012 is configured to emit the ultraviolet rays 1001. The third reflection plate 1013 is disposed above the light source 1012 and is configured to reflect the ultraviolet rays 1001 emitted from the light source 1012 toward an inner side of the light box 1011, to the to-be-cured display panel 105. In such a way, utilization rate of the ultraviolet rays 1001 is increased and the efficiency is improved.

In addition, the sample stage 104 of the present preferred embodiment can be implemented by a conveyor belt for transmitting the to-be-cured display panel along a horizontal direction. Specifically, the to-be-cured display panel 105 can be transmitted to a position below the light source assembly 101 by the conveyor belt when a curing process is performed using the ultraviolet curing device 10 of the present disclosure. After the display panel is cured, the cured display panel is transmitted along with the conveyor belt and is transmitted to a back-end area. Then, a next to-be-cured display panel is transmitted to a position below the light source assembly 101. In such a way, the efficiency is further improved.

Both of the first reflection plate 102 and the second reflection plate 103 of the present disclosure can be extended along their lengthwise directions 1021 and 1031. In such a way, the distance between the light source assembly 101 and the to-be-cured display panel 105 is adjustable. Also, the ultraviolet rays 1001 emitted from the light source assembly 101 are all able to be used to cure the to-be-cured display panel 105. Preferably, the first reflection plate 102 and the second reflection plate 103 can have scales disposed thereon. In using the ultraviolet curing device 10 of the present disclosure to perform the curing process, the distance between the light source assembly 101 and the to-be-cured display panel 105 can be adjusted as needed. In such a way, the heat emanated from the light source assembly 101 will not affect the to-be-cured display panel 105. Further, the ultraviolet rays 1001 emitted from the light source assembly 101 will irradiate toward the two sides of the light source assembly 101 and this cause the ultraviolet rays 1001 to scatter when the distance between the light source assembly 101 and the to-be-cured display panel 105 is increased. In the present disclosure, the first reflection plate 102 and the second reflection plate 103 are disposed at the two sides of the light source assembly 101, respectively. Also, both of the first reflection plate 102 and the second reflection plate 103 of the present disclosure can be extended along their lengthwise directions 1021 and 1031. In such a way, the ultraviolet rays 1001 scattered toward the two sides of the light source assembly 101 are reflected to the to-be-cured display panel 105.

Particularly, in the present preferred embodiment, the first reflection plate 102 is connected to the light source assembly 101 via a first angle adjusting member 106, and the second reflection plate 103 is connected to the light source assembly 101 via a second angle adjusting member 107. In such a way, the angle between the first reflection plate 102 and the light source assembly 101 is adjustable as well as the angle between the second reflection plate 103 and the light source assembly 101 is adjustable. In using the ultraviolet curing device 10 of the present disclosure to perform the curing process, the angle between the first reflection plate 102 and the light source assembly 101 and the angle between the second reflection plate 103 and the light source assembly 101 can be adjusted as needed. In such a way, the ultraviolet rays 1001 irradiating the first reflection plate 102 and the second reflection plate 103 can be directed to the to-be-cured display panel 105 at a certain angle. In such a way, the curing is better carried out.

Preferably, both of the first reflection plate 102 and the second reflection plate 103 of the present preferred embodiment are a barrel with an adjustable length. The first reflection plate 102 and the second reflection plate 103 are configured to be a scalable barrel structure. In such a way, an adjustable distance is carried out between the light source assembly 101 and the to-be-cured display panel 102 in the present disclosure. Further, the first reflection plate 102 and the second reflection plate 103 can be made of a heat-resistant material such as metal.

In the ultraviolet curing device of the present preferred embodiment, the first reflection plate and the second reflection plate are disposed at the two sides of the light source assembly. The first reflection plate and the second reflection plate are configured to reflect the ultraviolet rays emitted from the light source assembly toward the two sides of the light source assembly, to the to-be-cured display panel. Also, the first reflection plate and the second reflection plate can be extended along their lengthwise directions. In such a way, the present disclosure can prevent the heat emanated from the light source assembly from affecting the to-be-cured display panel. Also, the ultraviolet rays scattered toward the two sides of the light source assembly can be reflected to the to-be-cured display panel. The efficiency is improved.

Figure 2:
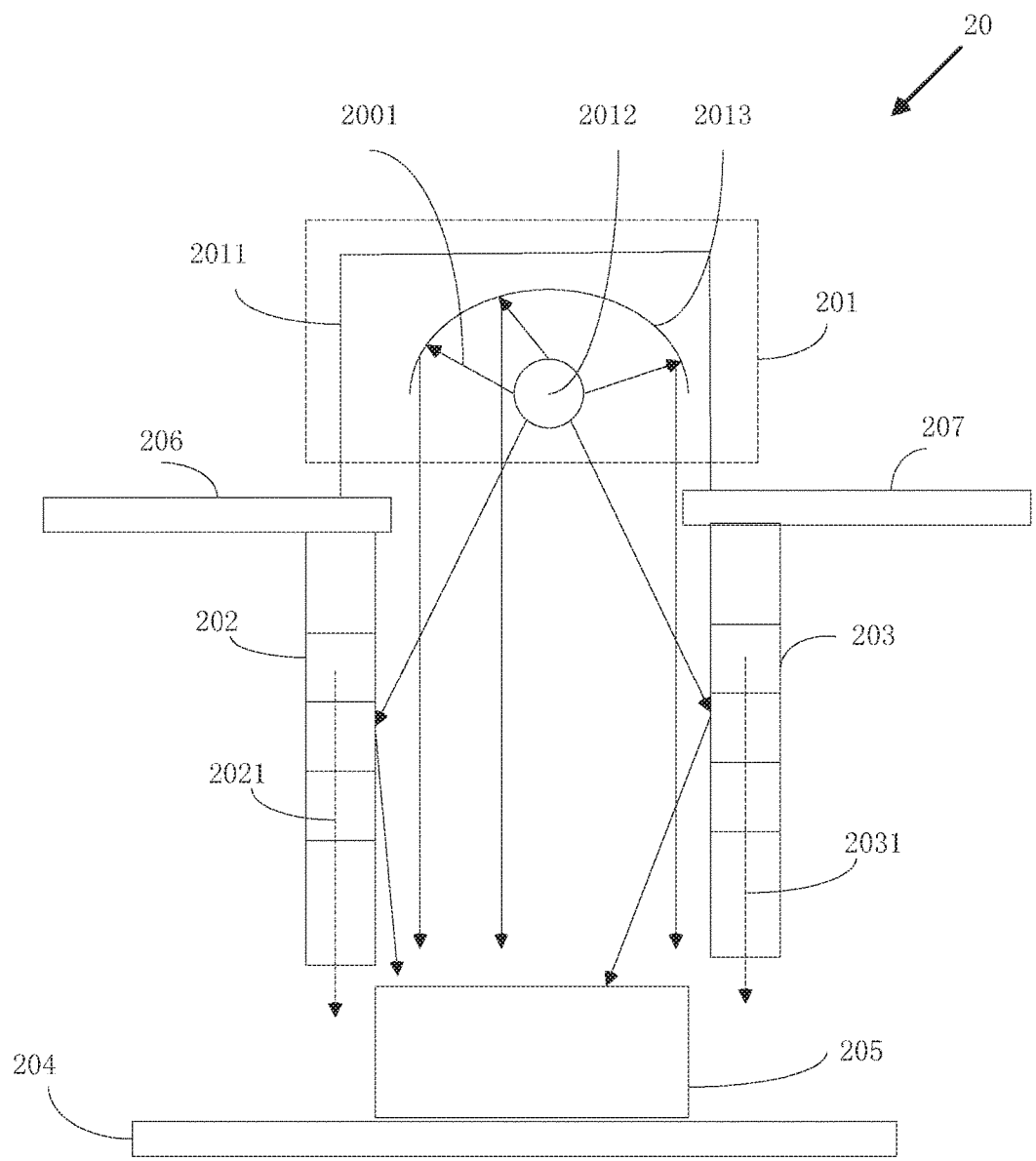
FIG. 2 is a schematic structural diagram illustrating an ultraviolet curing device provided in accordance with a second preferred embodiment of the present disclosure.

FIG. 2 is a schematic structural diagram illustrating an ultraviolet curing device provided in accordance with a second preferred embodiment of the present disclosure. As shown in FIG. 1, the ultraviolet curing device 20 provided in the present preferred embodiment includes a light source assembly 201, a first reflection plate 202, a second reflection plate 203, and a sample stage 204. The light source assembly 201 is configured to emit ultraviolet rays 2001. Both of the first reflection plate 202 and the second reflection plate 203 are connected to the light source assembly 201 and are disposed at two sides of the light source assembly 201, respectively. The first reflection plate 202 and the second reflection plate 203 are configured to reflect the ultraviolet rays emitted from the light source assembly 201 toward the two sides of the light source assembly 201, to a to-be-cured display panel 205. The sample stage 204 is disposed beneath the light source assembly 201 and is configured to support the to-be-cured display panel 205.

Further, the light source assembly 201 includes a light box 2011, and a light source 2012 and a third reflection plate 2013 disposed inside the light box 1011. The light box 2011 is configured to support the light source 2012 and the third reflection plate 2013. The light source 2011 is configured to emit the ultraviolet rays 2001. The third reflection plate 2013 is disposed above the light source 2012 and is configured to reflect the ultraviolet rays 2001 emitted from the light source 2011 toward an inner side of the light box 2011, to the to-be-cured display panel 205. In such a way, utilization rate of the ultraviolet rays 2001 is increased and the efficiency is improved.

In addition, the sample stage 204 of the present preferred embodiment can be implemented by a conveyor belt for transmitting the to-be-cured display panel along a horizontal direction. Specifically, the to-be-cured display panel 205 can be transmitted to a position below the light source assembly 201 by the conveyor belt when a curing process is performed using the ultraviolet curing device 20 of the present disclosure. After the display panel is cured, the cured display panel is transmitted along with the conveyor belt and is transmitted to a back-end area. Then, a next to-be-cured display panel is transmitted to a position below the light source assembly 201. In such a way, the efficiency is further improved.

Both of the first reflection plate 202 and the second reflection plate 203 of the present disclosure can be extended along their lengthwise directions 2021 and 2031. In such a way, the distance between the light source assembly 201 and the to-be-cured display panel 205 is adjustable. Also, the ultraviolet rays 2001 emitted from the light source assembly 201 are all able to be used to cure the to-be-cured display panel 205. Preferably, the first reflection plate 202 and the second reflection plate 203 can have scales disposed thereon. In using the ultraviolet curing device 20 of the present disclosure to perform the curing process, the distance between the light source assembly 201 and the to-be-cured display panel 205 can be adjusted as needed. In such a way, the heat emanated from the light source assembly 201 will not affect the to-be-cured display panel 205. Further, the ultraviolet rays 2001 emitted from the light source assembly 201 will irradiate toward the two sides of the light source assembly 201 and this cause the ultraviolet rays 2001 to scatter when the distance between the light source assembly 201 and the to-be-cured display panel 205 is increased. In the present disclosure, the first reflection plate 202 and the second reflection plate 203 are disposed at the two sides of the light source assembly 201, respectively. Also, both of the first reflection plate 202 and the second reflection plate 203 of the present disclosure can be extended along their lengthwise directions 2021 and 2031. In such a way, the ultraviolet rays 2001 scattered toward the two sides of the light source assembly 201 are reflected to the to-be-cured display panel 205.

Particularly, in the present preferred embodiment, the first reflection plate 202 is connected to the light source assembly 201 via a first position adjusting member 206, and the second reflection plate 203 is connected to the light source assembly 201 via a second position adjusting member 207. In such a way, the distance between the first reflection plate 202 and the light source assembly 101 is adjustable. In using the ultraviolet curing device 20 of the present disclosure to perform the curing process, the distance between the first reflection plate 202 and the light source assembly 203 can be adjusted as needed. In such a way, the ultraviolet curing device 20 of the present disclosure is more flexible and convenient. Also, an area irradiated by the ultraviolet rays 2001 can be deployed to be larger than the area of the to-be-cured display panel 205. In such a way, the to-be-cured display panel can be cured with a better effect.

Preferably, both of the first reflection plate 202 and the second reflection plate 203 of the present preferred embodiment are a barrel with an adjustable length. The first reflection plate 202 and the second reflection plate 203 are configured to be a scalable barrel structure. In such a way, an adjustable distance is carried out between the light source assembly 201 and the to-be-cured display panel 205 in the present disclosure. Further, the first reflection plate 202 and the second reflection plate 203 can be made of a heat-resistant material such as metal.

In the ultraviolet curing device of the present disclosure, the first reflection plate and the second reflection plate are disposed at the two sides of the light source assembly. The first reflection plate and the second reflection plate are configured to reflect the ultraviolet rays emitted from the light source assembly toward the two sides of the light source assembly, to the to-be-cured display panel. Also, the first reflection plate and the second reflection plate can be extended along their lengthwise directions. In such a way, the present disclosure can prevent the heat emanated from the light source assembly from affecting the to-be-cured display panel. Also, the ultraviolet rays scattered toward the two sides of the light source assembly can be reflected to the to-be-cured display panel. The efficiency is improved.

Above all, while the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An ultraviolet curing device, comprising a light source assembly, and a first reflection plate and a second reflection plate connected to the light source assembly and disposed at two sides of the light source assembly, respectively;
    the light source assembly configured to emit ultraviolet rays, the first reflection plate and the second reflection plate configured to reflect the ultraviolet rays emitted from the light source assembly toward the two sides of the light source assembly, to a to-be-cured display panel;
    both of the first reflection plate and the second reflection plate being scalable along lengthwise directions to make a distance between the light source assembly and the to-be-cured display panel adjustable and make all the ultraviolet rays from the light source assembly be able to be used to cure the to-be-cured display panel;
    both of the first reflection plate and the second reflection plate configured to be a barrel with an adjustable length;
    both of the first reflection plate and the second reflection plate made of a heat-resistant material.

2. The ultraviolet curing device according to claim 1, wherein the first reflection plate is connected to the light source assembly via a first angle adjusting member, and the second reflection plate is connected to the light source assembly via a second angle adjusting member; the first angle adjusting member and the second angle adjusting member makes an angle between the first reflection plate and the light source assembly and an angle between the second reflection plate and the light source assembly adjustable.

3. The ultraviolet curing device according to claim 1, wherein the first reflection plate is connected to the light source assembly via a first position adjusting member, and the second reflection plate is connected to the light source assembly via a second position adjusting member; the first position adjusting member and the second position adjusting member makes a distance between the first reflection plate and the second reflection plate adjustable.

4. The ultraviolet curing device according to claim 1, wherein the heat-resistant material is metal.

5. The ultraviolet curing device according to claim 1, further comprising a sample stage disposed beneath the light source assembly and configured to support the to-be-cured display panel.

6. The ultraviolet curing device according to claim 5, wherein the sample stage is a conveyor belt for transmitting the to-be-cured display panel along a horizontal direction.

7. The ultraviolet curing device according to claim 1, wherein the light source assembly comprises a light box, and a light source and a third reflection plate disposed inside the light box;
    the third reflection plate configured to reflect the ultraviolet rays emitted from the light source toward an inner side of the light box, to the to-be-cured display panel.

8. The ultraviolet curing device according to claim 1, wherein the first reflection plate and the second reflection plate are deployed with scales.

9. An ultraviolet curing device, comprising a light source assembly, and a first reflection plate and a second reflection plate connected to the light source assembly and disposed at two sides of the light source assembly, respectively;
    the light source assembly configured to emit ultraviolet rays, the first reflection plate and the second reflection plate configured to reflect the ultraviolet rays emitted from the light source assembly toward the two sides of the light source assembly, to a to-be-cured display panel;
    both of the first reflection plate and the second reflection plate being scalable along lengthwise directions to make a distance between the light source assembly and the to-be-cured display panel adjustable and make all the ultraviolet rays from the light source assembly be able to be used to cure the to-be-cured display panel.

10. The ultraviolet curing device according to claim 9, wherein both of the first reflection plate and the second reflection plate are configured to be a barrel with an adjustable length.

11. The ultraviolet curing device according to claim 10, wherein the first reflection plate is connected to the light source assembly via a first angle adjusting member, and the second reflection plate is connected to the light source assembly via a second angle adjusting member; the first angle adjusting member and the second angle adjusting member makes an angle between the first reflection plate and the light source assembly and an angle between the second reflection plate and the light source assembly adjustable.

12. The ultraviolet curing device according to claim 10, wherein the first reflection plate is connected to the light source assembly via a first position adjusting member, and the second reflection plate is connected to the light source assembly via a second position adjusting member; the first position adjusting member and the second position adjusting member makes a distance between the first reflection plate and the second reflection plate adjustable.

13. The ultraviolet curing device according to claim 9, wherein both of the first reflection plate and the second reflection plate are made of a heat-resistant material.

14. The ultraviolet curing device according to claim 13, wherein the heat-resistant material is metal.

15. The ultraviolet curing device according to claim 9, further comprising a sample stage disposed beneath the light source assembly and configured to support the to-be-cured display panel.

16. The ultraviolet curing device according to claim 15, wherein the sample stage is a conveyor belt for transmitting the to-be-cured display panel along a horizontal direction.

17. The ultraviolet curing device according to claim 9, wherein the light source assembly comprises a light box, and a light source and a third reflection plate disposed inside the light box;

the third reflection plate configured to reflect the ultraviolet rays emitted from the light source toward an inner side of the light box, to the to-be-cured display panel.

18. The ultraviolet curing device according to claim 9, wherein the first reflection plate and the second reflection plate are deployed with scales.

* * * * *